(12) United States Patent
Watanabe (10) Patent No.: US 6,987,607 B2
(45) Date of Patent: Jan. 17, 2006

(54) OPTICAL AND GATE AND WAVEFORM SHAPING DEVICE

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 10/602,629

(22) Filed: Jun. 25, 2003

(65) Prior Publication Data
US 2004/0004780 A1     Jan. 8, 2004

(30) Foreign Application Priority Data
Jul. 5, 2002    (JP)    ............................. 2002-197109

(51) Int. Cl.
G02F 1/365    (2006.01)
G02F 2/02    (2006.01)
G02F 3/00    (2006.01)
(52) U.S. Cl. ...................... 359/332; 359/108; 359/326
(58) Field of Classification Search ........ 359/326–332, 359/107, 108
See application file for complete search history.

(56) References Cited

U.S. PATENT DOCUMENTS 5,150,248 A * 9/1992 Alfano et al. ............... 398/147
6,477,300 B2 * 11/2002 Watanabe et al. ............. 385/42
6,801,349 B2 * 10/2004 Kim et al. .................. 359/108

FOREIGN PATENT DOCUMENTS

JP    2001-117125 A    4/2001

* cited by examiner

Primary Examiner—John D. Lee
(74) Attorney, Agent, or Firm—Staas & Halsey LLP

(57) ABSTRACT

The method according to the present invention includes the steps of inputting an optical signal having a first wavelength and probe light having a second wavelength different from the first wavelength into a nonlinear optical medium, broadening the spectrum of the probe light through cross phase modulation between the optical signal and the probe light inside the nonlinear optical medium, and extracting a signal component including a modulated component of the optical signal and having a band narrower than the band of the spectrum broadened. According to the present invention it can be possible to provide a method and device which can easily convert the wavelength of signal light into an arbitrary wavelength in performing optical 3R functions.

18 Claims, 8 Drawing Sheets

OPTICAL AND GATE AND WAVEFORM SHAPING DEVICE

BACKGROUND OF THE INVENTION

1. Field of the Invention

The present invention relates to a method and device for waveform-shaping signal light, and more particularly to an optical AND gate for performing optical signal regeneration by an optical signal and an optical clock.

2. Description of the Related Art

In an optical fiber communication system that has been put to practical use in recent years, a reduction in signal power due to transmission line loss, coupling loss, etc. is compensated by using an optical amplifier such as an erbium doped fiber amplifier (EDFA). The optical amplifier is an analog amplifier, which functions to linearly amplify a signal. In this kind of optical amplifier, amplified spontaneous emission (ASE) noise generated in association with the amplification is added to cause a reduction in signal-to-noise ratio (S/N ratio), so that the number of repeaters is limited to result in the limit of a transmission distance. Further, waveform degradation due to the chromatic dispersion owned by an optical fiber and the nonlinear optical effects in the fiber is another cause of the transmission limit. To break down such a limit, a regenerative repeater for digitally processing a signal is required, and it is desirable to realize such a regenerative repeater. In particular, an all-optical regenerative repeater capable of performing all kinds of signal processing in optical level is important in realizing a transparent operation independent of the bit rate, pulse shape, etc. of a signal.

The functions required for the all-optical regenerative repeater are amplitude restoration or reamplification, waveform shaping or reshaping, and timing restoration or retiming. These functions are referred to as 3R functions, and in particular, the first and second functions are referred to as 2R functions.

An opto-electro-optic (O-E-O) conversion type device and an all-optical type device are known as a device for regenerating an optical signal on the optical level. The O-E-O conversion type device is a device for once converting an optical signal into an electrical signal, next regenerating the electrical signal on the electrical stage, and finally modulating laser light by using the regenerated electrical signal to convert it into an optical signal. On the other hand, the all-optical type device is a device for regenerating an optical signal on the optical level without conversion into an electrical signal. As the O-E-O conversion type device, a device operating at about 10 Gb/s has already been put to practical use. However, since the performance of this device depends on the operating speed of electronics, it is difficult to operate the O-E-O conversion type device at 40 Gb/s or higher bit rate. On the other hand, the all-optical type device has not yet reached a practical level, but some methods have been proposed.

A Mach-Zehnder interferometer (MZI) type optical gate is known as a typical all-optical waveform shaping device. This optical gate is configured by integrating a Mach-Zehnder interferometer including first and second nonlinear optical media each for providing a phase shift on an optical waveguide substrate, for example. Probe light as continuous wave (CW) light or optical pulses is equally divided into two components, which are in turn supplied to the first and second nonlinear optical media. The optical path length of the interferometer is set so that output light is not obtained by interference of the two components of the probe light. Signal light is further supplied to one of the first and second nonlinear optical media. By properly setting the powers of the signal light and the probe light, a converted optical signal synchronous with the signal light is output from the optical gate. The converted optical signal has the same wavelength as that of the probe light.

It has been proposed to use a semiconductor optical amplifier (SOA) as each of the first and second nonlinear optical media. For example, an InGaAs-SOA having opposite end faces treated with antireflection coatings is used as each nonlinear optical medium in a 1.5 $\mu$m band, and these nonlinear optical media are integrated on an InP/GaInAsP substrate to fabricate an optical gate. In particular, a type of optical gate called an ultrafast nonlinear interferometer (UNI) has been proposed to improve an operating speed. In this interferometer, the timing of passing of optical pulses through one of the two optical paths is slightly shifted from the timing of passing of optical pulses through the other optical path to thereby improve the limit to the operating speed due to the carrier effect of a semiconductor medium.

A nonlinear optical loop mirror (NOLM) is known as another conventional waveform shaping device. The NOLM includes a first optical coupler including first and second optical paths directionally coupled to each other, a loop optical path for connecting the first and second optical paths, and a second optical coupler including a third optical path directionally coupled to the loop optical path.

By forming a part or the whole of the loop optical path from a nonlinear optical medium and supplying probe light and signal light respectively to the first optical path and the third optical path, a converted optical signal is output from the second optical path.

An optical fiber is generally used as the nonlinear optical medium in the NOLM. In particular, a NOLM using a SOA as the nonlinear optical medium is referred to as an SLA-LOM (Semiconductor Laser Amplifier in a Loop Mirror).

By combining a waveform shaping device and an optical clock regenerating device, the 3R functions can be provided. In this case, generally, signal light to be 3R-regenerated and regenerated optical clock pulses are input into an optical AND gate, in which data owned by the signal light is transferred to the regenerated optical clock by the AND operation. The waveform shaping can be effected by locating the waveform shaping device on the front or rear stage of the optical AND gate, or by making the optical AND gate have a waveform shaping function.

The waveform shaping device for providing the optical 3R functions has a problem that sufficient 3R functions cannot be obtained in some case according to a relative temporal deviation between the signal light and the regenerated optical clock pulses input into the optical AND gate. Such a relative temporal deviation may be caused by the walk-off between the signal light and the regenerated optical clock pulses in the optical AND gate or the temporal instability and jitter of each optical pulse, for example.

The 3R functions are conventionally provided by an MZI type optical gate switch as mentioned above, for example. The present inventors have already proposed a waveform shaping device for providing the 2R functions and/or the 3R functions (Japanese Patent Application No. 11-293189) In this device, two NOLMs are combined to thereby increase the degree of freedom of wavelength conversion in the case of obtaining a function of waveform shaping or optical gate. However, in performing wavelength conversion by an optical AND gate such as a NOLM as mentioned above or an optical regenerative repeater, probe light to be input must be generated at a wavelength intended to be finally obtained, so that the wavelength allowed to be converted is determined by a laser for generating the probe light.

SUMMARY OF THE INVENTION

It is therefore an object of the present invention to provide a method and device which can easily-convert the wavelength of signal light into an arbitrary wavelength in performing optical 3R functions. Other objects of the present invention will become apparent from the following description.

In accordance with a first aspect of the present invention, there is provided an optical AND gate. including: a nonlinear optical medium for inputting signal light having a first wavelength and probe light having a second wavelength different from the first wavelength and producing cross phase modulation of the probe light with the signal light to thereby output spectrally broadened light; and an optical filter for extracting light including a modulated component of the signal light and having a band narrower than the band of the spectrally broadened light, from the spectrally broadened light.

With this configuration, the spectrum of the probe light is broadened in the nonlinear optical medium of the optical AND gate through the cross phase modulation with the signal light to obtain the spectrally broadened light, and a new signal component is extracted from the spectrally broadened light. Accordingly, the converted light having an arbitrary wavelength can be output from the optical AND gate without changing the wavelength of the probe light. As a result, the degree of freedom of wavelength conversion can be increased.

Further, fluctuations in output level can be suppressed by the spectral broadening, so that the amplitude noise of the signal light can be suppressed.

Accordingly, optical signal processing such as optical 3R processing, wavelength conversion processing, and optical demultiplexing can be stably performed also to an ultrafast signal.

In accordance with a second aspect of the present invention, there is provided a waveform shaping device including: a second nonlinear optical medium for inputting output light from an optical AND gate according to the first aspect of the present invention and producing self phase modulation of the output light from the optical AND gate to thereby output second spectrally broadened light; and a second optical filter for extracting light including a signal component of the output light from the optical AND gate and having a band, narrower than the band of the second spectrally broadened light, from the second spectrally broadened light.

With this configuration, the wavelength of the converted light output from the optical AND gate according to the first aspect of the present invention is further converted into an arbitrary wavelength by broadening the spectrum of the input converted light through the self phase modulation produced in the second nonlinear optical medium to obtain the second spectrally broadened light and extracting a new signal component from the second spectrally broadened light. Accordingly, the degree of freedom of wavelength conversion can be further increased. Moreover, the wavelength of the output light from this device can be converted into the same wavelength as that of the signal light input into the optical AND gate, so that signal light reduced in amplitude noise can be obtained at the wavelength of the signal light input into the optical AND gate. Further, fluctuations in optical level can be suppressed by the spectral broadening of the output light from the optical AND gate through the self phase modulation, so that the amplitude noise of the signal light can be suppressed more than that in the case of only the optical AND gate.

In accordance with a third aspect of the present invention, there is provided a waveform shaping device including: a second nonlinear optical medium for inputting output light from an optical AND gate according to the first aspect of the present invention and second probe light having a wavelength different from the wavelength of the output light from the optical AND gate and producing cross phase modulation of the second probe light with the output light from the optical AND gate to thereby output second spectrally broadened light; and a second optical filter for extracting light including a signal component of the output light from the optical AND gate and having a band narrower than the band of the second spectrally broadened light, from the second spectrally broadened light.

With this configuration, the spectrum of the second probe light is broadened in the second nonlinear optical medium of the waveform shaping device through the cross phase modulation with the output light from the optical AND gate. Accordingly, the converted light having an arbitrary wavelength can be output from the waveform, shaping device without changing the wavelength of the second probe light. As a result, the degree of freedom of wavelength conversion can be increased. Furthermore, the wavelength of the output light from this device can be converted into the same wavelength as that of the signal light input into the optical AND gate, so that signal light reduced in amplitude noise can be obtained at the wavelength of the signal light input into the optical AND gate. Further, fluctuations in output level can be suppressed by the spectral broadening of the second probe light through the cross phase modulation with the output light from the optical AND gate, so that the amplitude noise of the signal light can be suppressed more than that in the case of only the optical AND gate.

In accordance with a fourth aspect of the present invention, there is provided a waveform shaping device including: an optical AND gate; a nonlinear optical medium for inputting output light from the optical AND gate and probe light having a wavelength different from the wavelength of the output light from the optical AND gate and producing cross phase modulation of the probe light with the output light from the optical AND gate to thereby output spectrally broadened light; and an optical filter for extracting light including a signal component of the output light from the optical AND gate and having a band narrower than the band of the spectrally broadened light, from the spectrally broadened light.

With this configuration, the spectrum of the,probe light is broadened in the nonlinear optical medium through the cross phase modulation with the signal light from the optical AND gate. Accordingly, the converted light having an arbitrary wavelength can be output from the waveform shaping device without changing the wavelength of the probe light. As a result, the degree of freedom of wavelength conversion can be increased. Furthermore, fluctuations in output level can be suppressed by the spectral broadening of the probe light through the cross phase modulation with the output light from the optical AND gate, so that the amplitude noise of the signal light can be suppressed.

In accordance with a fifth aspect of the present invention, there is provided an optical AND gate or a waveform shaping device according to the first, second, third or fourth aspect of the present invention, wherein the signal light and the probe light to be input into the optical AND gate are light obtained by broadening the pulse width of signal light from a transmission line and an optical clock extracted from the signal light from the transmission line, respectively. With this configuration, it is possible to suppress amplitude noise or the like produced in the optical AND gate due to the jitter or temporal instability of the signal light and the clock pulses.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Some preferred embodiments of the present invention will now be described in detail with reference to the attached drawings. Throughout the drawings, substantially the same or like parts are denoted by the same reference numerals.

In a preferred embodiment of the present invention, probe light is subjected to cross phase modulation (XPM) by signal light in an optical AND gate to thereby broaden the spectrum of the probe light, and a component different from the center wavelength of the spectrum is extracted from the broadened spectrum by an optical bandpass filter to thereby extract a wavelength converted signal component.

For example, the wavelength converted signal component is further subjected to wavelength conversion to thereby make the wavelength of the wavelength converted signal component equal to the wavelength of the original signal light or to any arbitrary wavelength. This wavelength conversion may be effected by broadening the spectrum by self phase modulation (SPM) and extracting a component different from the center wavelength of the broadened spectrum by an optical bandpass filter. By this method, waveform shaping for suppression of amplitude noise can be applied to the signal light.

As another method for the last wavelength conversion, cross phase modulation (XPM) may be adopted to broaden the spectrum.

As the probe light to be input into the optical AND gate or a waveform shaper for performing XPM, continuous wave light (CW light) or an optical pulse train may be used. In particular, optical clock pulses regenerated from the original signal light may be used as the optical pulse train.

According to the present invention, it is possible to provide an optical signal processing device such as an optical 3R device, wavelength converting device, and optical demultiplexer, which can suppress amplitude noise and jitter of signal light and can stably perform optical signal processing for a high-speed signal.

Figure 1:
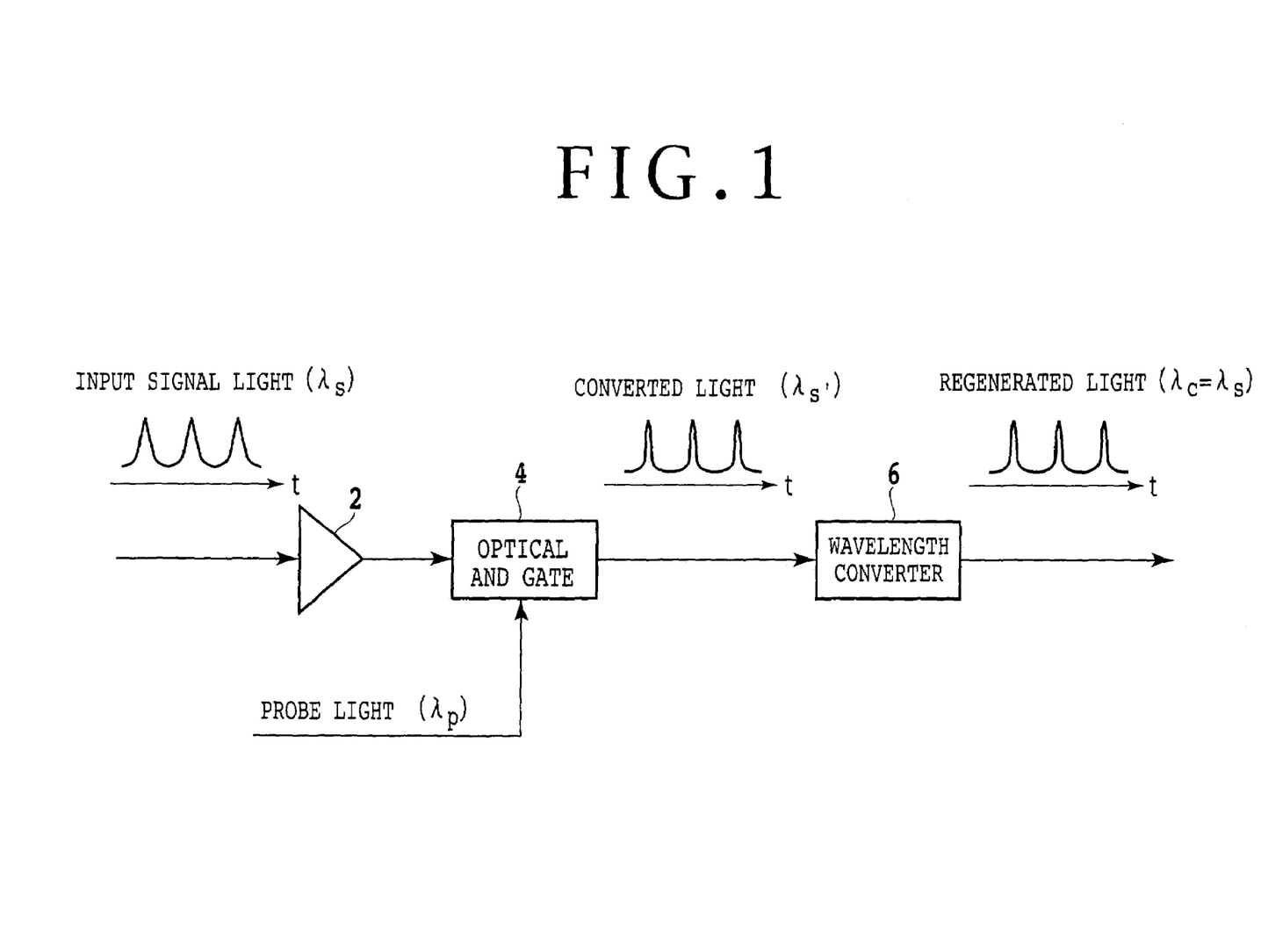
FIG. 1 is a block diagram showing a basic configuration of the device according to the present invention.

Referring to FIG. 1, there is shown a basic configuration of the above preferred embodiment of the present invention.

Input signal light having a wavelength $\lambda s$ is amplified by an optical amplifier 2 such as an EDFA (erbium doped fiber amplifier) to obtain a suitable power, and is next supplied to an optical AND gate 4. On the other hand, probe light having a wavelength $\lambda p$ is supplied to the optical AND gate 4 with a suitable power.

In the optical AND gate 4, converted light having a wavelength $\lambda s'$ is obtained by the logical product produced by nonlinear optical effects. The converted light output from the optical AND gate 4 is input into a wavelength converter 6.

The wavelength converter 6 functions to convert the wavelength of the input converted light into a wavelength $\lambda c$ and to output regenerated light having the wavelength $\lambda c$. The wavelength $\lambda c$ of the regenerated light may be set equal to the wavelength $\lambda s$ of the input signal light, for example.

The optical AND gate 4 for performing the wavelength conversion into an arbitrary wavelength may be realized by using spectral broadening through XPM.

Figure 2:
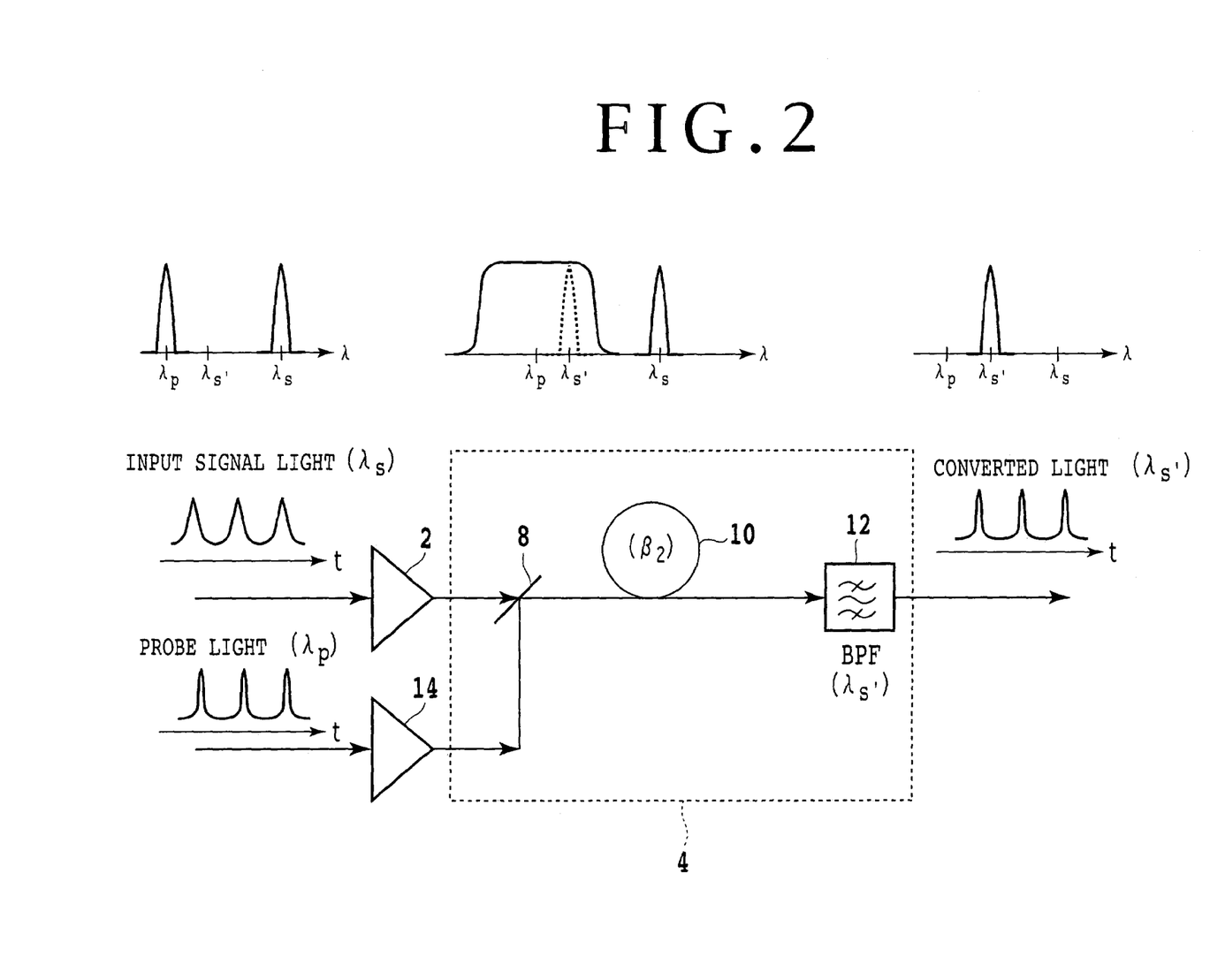
FIG. 2 is a block diagram showing a preferred embodiment of the device according to the present invention.

FIG. 2 is a block diagram showing a preferred embodiment of the optical AND gate 4 shown in FIG. 1.

The optical AND gate 4 includes an optical coupler 8 for combining the input signal light and the probe light, an optical fiber 10 as a nonlinear optical medium for inputting the signal light and the probe light from the optical coupler 8, and an optical bandpass filter (BPF) 12 to which light output from the optical fiber 10 is supplied.

When optical pulses are input into the optical nonlinear medium, chirping is induced by XPM to thereby broaden the spectrum of the probe light.

As shown in an upper portion of FIG. 2, the input signal light having a wavelength $\lambda s$ and the probe light having a wavelength $\lambda p$ are combined by the optical coupler 8 and input into the optical fiber 10.

As the probe light, continuous wave light (CW light) or an optical pulse train as shown in FIG. 2 may be used. In particular, optical clock pulses regenerated from the original signal light may be used as the optical pulse train.

It is understood from FIG. 2 that the spectrum of the probe light is broadened with respect to its center wavelength $\lambda p$ in the optical fiber 10.

In the range of this broadened spectrum, a signal component is extracted by the optical bandpass filter 12 having a passband whose center wavelength $\lambda s'$ is different from the wavelength $\lambda p$. This passband is set narrower than the width of the broadened spectrum.

Even in the case that the amplitudes of the pulses of the signal light which should be normally constant are different from each other because of distortion by transmission or the like (amplitude fluctuations or amplitude noise), the spectrum is constant in the range where chirping is generated, so that the amplitude fluctuations can be suppressed. In other words, a waveform shaping function can be obtained.

In more detail, a small-chirp component and an excessive-chirp component are removed in the optical bandpass filter 12. The small-chirp component mainly includes fluctuations in off-power (bit 0) component from a zero point (e.g., waveform degradation due to group velocity dispersion (GVD)) and a small-slope component near the peak of the pulse.

On the other hand, the excessive-chirp component mainly includes a large-slope fluctuation component near the peak of an on-power (bit 1) component. These components determine an optical signal-to-noise ratio (OSNR). Accordingly, by removing these components by use of the optical bandpass filter 12, it is possible to suppress a reduction in OSNR due to the power fluctuations, extinction ratio degradation, noise accumulation, etc. of these components. Accordingly, wavelength conversion accompanied by the improvement in OSNR can be effected by the present invention.

It is preferable to sufficiently space the center wavelength $\lambda s'$ in the passband of the optical bandpass filter 12 from the center wavelength $\lambda p$ of the probe light so that the small-chirp component including noise and the excessive-chirp component are not included in the output signal pulse.

In the case that signal light having amplitude fluctuations is input, amplitude noise at the wavelength $\lambda p$ of the probe light is larger than that at the other wavelengths. Accordingly, the component corresponding to the wavelength $\lambda p$ must be removed. Further, both edge components of the spectrally broadened light corresponding to the shortest wavelength and the longest wavelength include much noise, so that it is preferable to remove these components.

It is preferable to suitably set the width and shape of the passband of the optical bandpass filter 12 according to the width and shape of a pulse required. Basically, the width of the passband of the optical bandpass filter 12 is preferably set substantially equal to the spectral width of an input signal before it is input into a transmission line and is degraded therein.

As the material for the nonlinear optical medium, an optical fiber (inclusive of a normal single-mode optical fiber) may be used.

In particular, a highly nonlinear fiber or a photonic crystal fiber (Holey fiber) is suitable.

The third-order nonlinear coefficient $\gamma$ of a single-mode optical fiber for transmission line is about 2 ($W^{-1}km^{-1}$) (a phase of 2 radians rotates when an optical power of 1 W is input into a fiber of 1 km) In contrast thereto, a highly nonlinear fiber having a third-order nonlinear coefficient $\gamma$ of about 20 ($W^{-1}km^{-1}$) and a photonic crystal fiber having a third-order nonlinear coefficient $\gamma$ of about 100 ($W^{-1}km^{-1}$) have been developed.

Further, the phase shift $\Delta\phi$ by XPM is approximately expressed as $\Delta\phi=\gamma PL$ ($\gamma$ is the third-order nonlinear coefficient, P is the optical power, and L is the length of the nonlinear optical medium).

Accordingly, XPM and SPM is strongly generated by increasing the input power, so that it is also effective to sufficiently increase the input optical power to the optical AND gate 4 by using the optical amplifiers 2 and 14.

For example, by setting the power $P(\lambda s)$ of the input signal light wavelength $\lambda s$ 10 to 100 times the power $P(\lambda p)$ of the probe light wavelength $\lambda p$, the probe light can be efficiently subjected to XPM.

Further, the third-order nonlinear coefficient $\gamma$ is expressed as $\gamma=2\pi n_2/\lambda Aeff$ ($n_2$ is the nonlinear refractive index, Aeff is the effective sectional area, and $\lambda$ is the wavelength). Accordingly, by reducing the effective sectional area as the area of a light propagation region of the nonlinear optical medium, it is possible to obtain substantially the same effect as that obtained by increasing the input power. While the optical bandpass filter 12 shown in FIG. 2 is a fixed bandpass filter, a tunable optical filter may be used instead to extract a given band of signal light.

In the case of only reducing amplitude noise and converting the wavelength of signal light into an arbitrary wavelength, the configuration shown in FIG. 2 is sufficient. However, in the case of restoring the original wavelength from the converted wavelength or converting the wavelength of signal light into a wavelength located outside the XPM-broadened spectral range, the output from the optical AND gate 4 may be supplied to the wavelength converter 6 as shown in FIG. 1 to perform further wavelength conversion.

Specific configurations of the wavelength converter 6 will now be described with reference to FIGS. 3 and 8.

Figure 3:
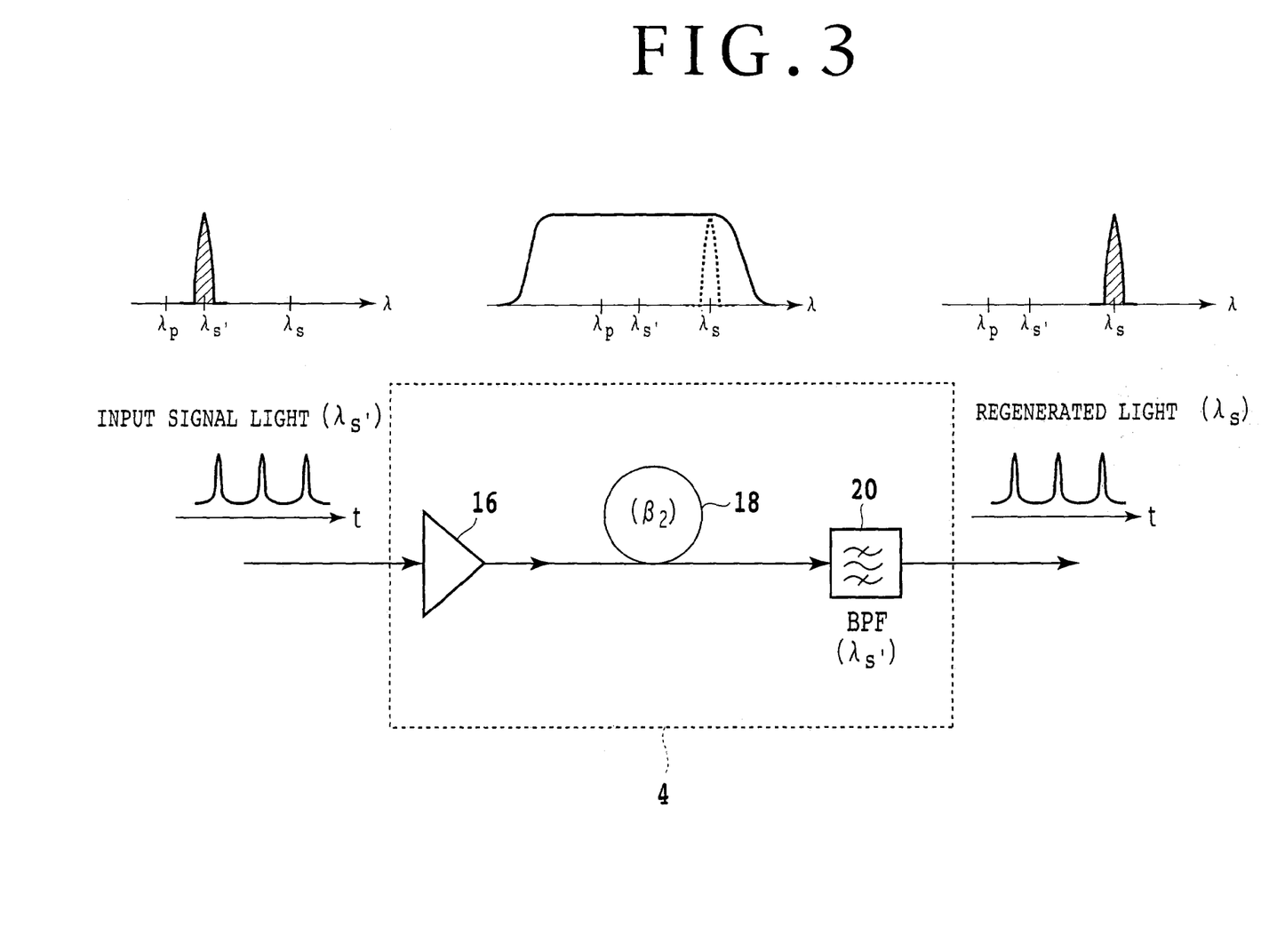
FIG. 3 is a block diagram showing a preferred embodiment of a wavelength converter applicable to the present invention.

In the configuration shown in FIG. 3, the converted light having the wavelength $\lambda s'$ is first amplified by an optical amplifier 16 to obtain a suitable power, and is next input into an optical fiber 18 as a nonlinear optical medium. As a result, the spectrum of the converted light is broadened with respect to its center wavelength $\lambda s'$ by self phase modulation (SPM). Further, this converted light having a broadened spectrum is supplied to an optical bandpass filter 20 having a passband whose center wavelength is the same as the wavelength $\lambda s$ of the original signal light, thereby extracting a signal component having a wavelength $\lambda s$ from the converted light having the broadened spectrum. Thus, regenerated light having the wavelength $\lambda s$ is output from the wavelength converter 6.

By performing this wavelength conversion, amplitude fluctuations yet remaining after the optical AND gate 4 (see FIG. 1) can be further suppressed. The principle of suppression of the amplitude fluctuations is similar to that in the case of applying XPM mentioned above, so the description thereof will be omitted herein.

Figure 8:
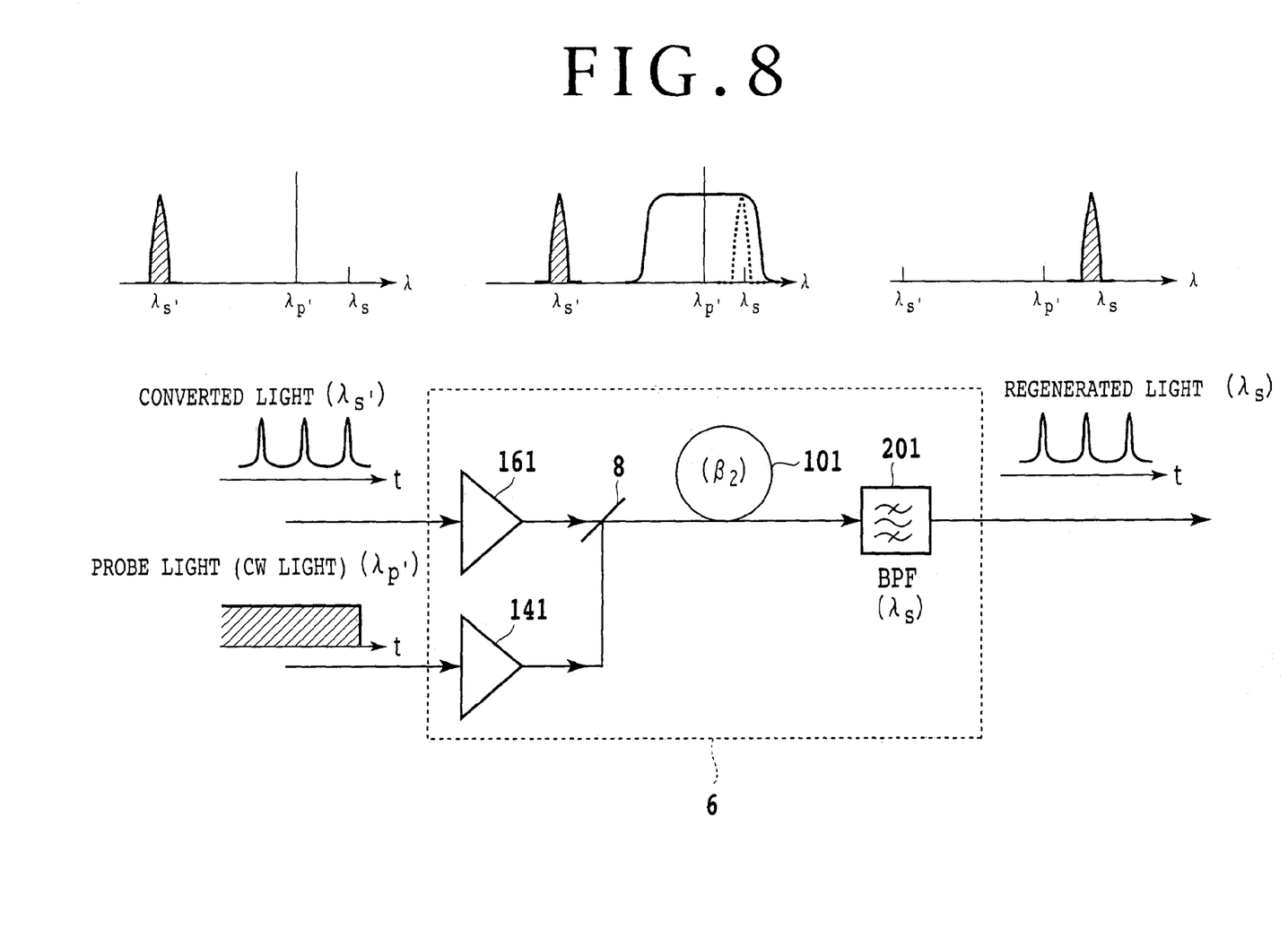
FIG. 8 is a block diagram showing another preferred embodiment of the wavelength converter applicable to the present invention.

FIG. 8 shows another configuration of the wavelength converter 6.

In the configuration shown in FIG. 8, the wavelength converter 6 includes an optical fiber 101, optical amplifiers 161 and 141, and an optical filter 201.

Converted light having a wavelength $\lambda s'$ from the optical AND gate (see FIG. 1) and CW light as probe light having a wavelength $\lambda p'$ are input into the optical fiber 101.

The spectrum of the CW light ($\lambda p'$) is broadened by XPM with the converted light ($\lambda s'$) in the optical fiber 101, and the CW light ($\lambda p'$) is converted into signal light having the same modulated component as that of the converted light ($\lambda s'$).

The wavelength $\lambda s$ of the signal light whose spectrum has been broadened with respect to its center wavelength $\lambda p'$ by XPM is next extracted by the optical filter 201 to thereby obtain regenerated light having a wavelength $\lambda s$.

The wavelength to be selected by the optical filter 201 may be set equal to an arbitrary wavelength of the spectrally broadened signal light whose center wavelength is $\lambda p'$, thereby restoring the wavelength $\lambda s$ of the signal light input into the optical signal regenerating device or converting the wavelength $\lambda s$ into another wavelength.

By performing this wavelength conversion, amplitude fluctuations yet remaining after the optical AND gate 4 (see FIG. 1) can be further suppressed.

To effectively produce XPM in the optical fiber 101, the converted light ($\lambda s'$) to be input into the optical fiber 101 is amplified by the optical amplifier 161 as required.

Further, the QW light ($\lambda p'$) to be input into the optical fiber 101 is amplified by the optical amplifier 141, because the optical S/N ratio of the regenerated light ($\lambda$s) is proportional to the power level of the CW light ($\lambda$p')

The relation between the output powers from the optical amplifiers 161 and 141 is similar to that shown in FIG. 2, and increasing the power of the converted light ($\lambda$s') is effective in producing XPM.

By using the configuration shown in FIG. 3 or 8 as the wavelength converter 6, spectral broadening and its associated amplitude noise suppression can be effected. Accordingly, While the optical AND gate 4 shown in FIG. 2 is an optical Kerr switch using XPM, any other means such as NOLM and UNI (ultrafast nonlinear interferometer) may be adopted as the optical AND gate 4. Further, any other means using nonlinear optical effects such as four-wave mixing and difference-frequency generation may also be adopted.

The configurations of FIGS. 3 and 8 may be used in combination for signal outputs in O-E-O conversion, for example.

In the preferred embodiment shown in FIG. 1, the optical AND gate 4 and the wavelength converter 6 may be used individually or in combination to thereby broaden the spectrum and select an arbitrary wavelength, thus allowing various types of optical switching including optical 3R.

It is important to consider the dispersion in the optical fiber used as the nonlinear optical medium mentioned with reference to FIGS. 2, 3, and 8.

From the viewpoint of effective spectral broadening, it is preferable to reduce the dispersion of the wavelength $\lambda$p and set the wavelength $\lambda$p in an anomalous dispersion region. However, if the dispersion is too small near zero, ASE (amplified spontaneous emission) noise generated from an optical amplifier or the like is nonlinearly amplified (modulation instability) to cause a degradation in S/N. Accordingly, it is effective to use an optical fiber in a normal dispersion region in order to ensure a high S/N. In this case, however, spectral broadening is limited.

Accordingly, in the case that a large wavelength shift takes priority, an anomalous dispersion region is preferably selected, whereas in the case that a high S/N takes priority over wavelength shift, a normal dispersion region is preferably selected. Thus, it is preferable to set an optimum dispersion according to a system required.

In the case of using an optical pulse train as the probe light, it is preferable to suppress the walk-off between the signal light and the probe light in the optical fiber 10 for producing XPM (see FIG. 2).

From this point of view, it is preferable to reduce the dispersion. For example, the dispersion may be reduced by a method of locating both the wavelength of the signal light and the wavelength of the probe light in a normal dispersion region or in an anomalous dispersion region, a method of locating both the wavelengths in symmetry with respect to a zero-dispersion wavelength to minimize the walk-off, a method of using a dispersion flattened fiber, or a method of using dispersion compensation.

Figure 4:
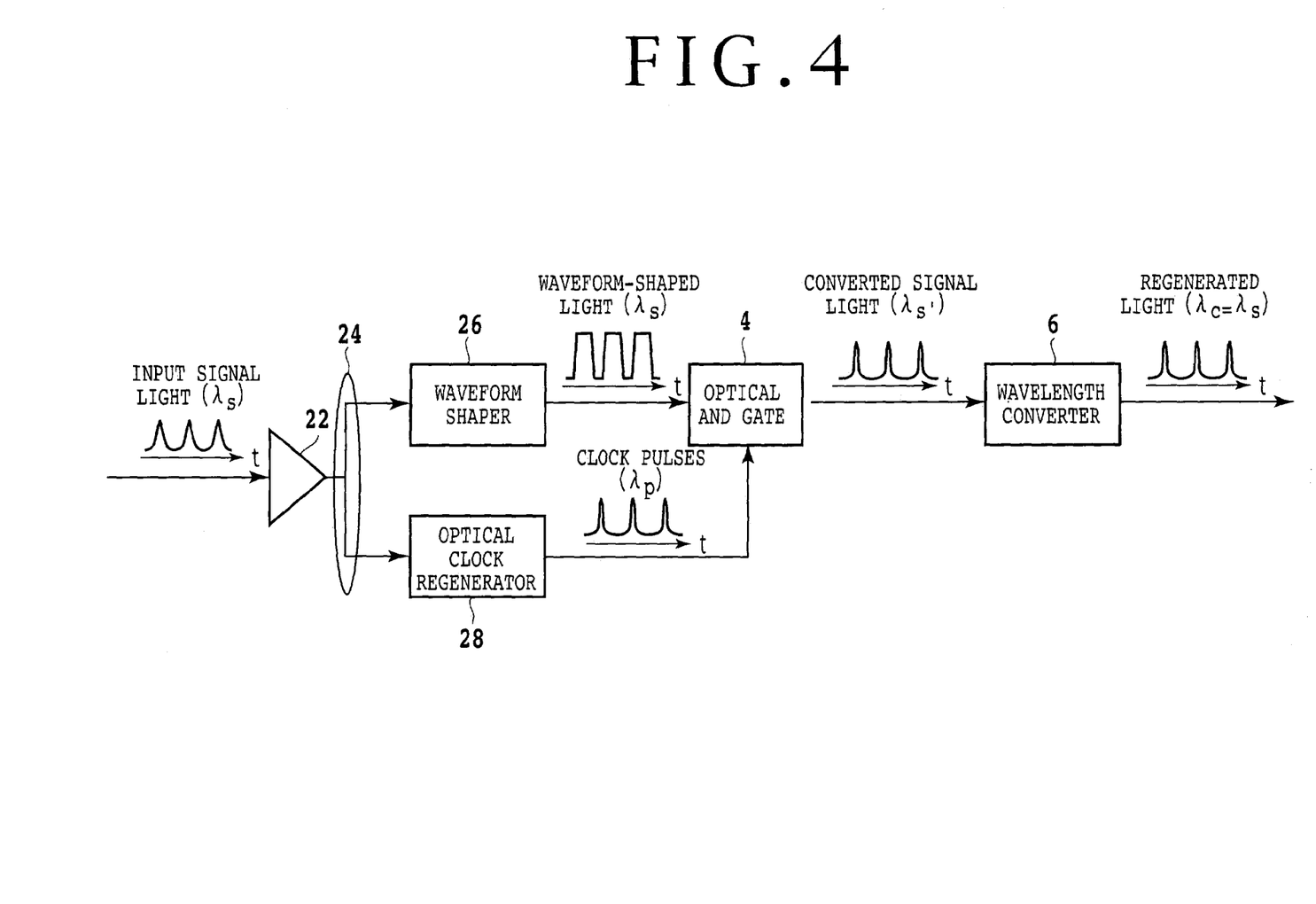
FIG. 4 is a block diagram showing another preferred embodiment of the device according to the present invention.

FIG. 4 is a block diagram showing another preferred embodiment of the device according to the present invention. This device includes an optical amplifier 22, an optical coupler 24, a waveform shaper 26, an optical clock regenerator 28, an optical AND gate 4, and a wavelength converter 6.

The optical AND gate 4 and the wavelength converter 6 may be the same as those shown in FIG. 1, respectively.

An optical signal (input signal light) having a wavelength $\lambda$s to be waveform-shaped, is amplified by the optical amplifier 22, and next split into first and second signal lights by the optical coupler 24.

The first signal light is supplied to the waveform shaper 26. In the waveform shaper 26, the pulse widths of the first-signal light are increased to obtain waveform-shaped light (wavelength $\lambda$s) The waveform shaped light thus obtained is output from the waveform shaper 26.

On the other hand, the second signal light is supplied to the optical clock regenerator 28. In the optical clock regenerator 28, clock pulses as probe light having a wavelength $\lambda$p are generated according to the second signal light.

Both the waveform-shaped light and the clock pulses are supplied to the optical AND gate 4. In the optical AND gate 4, a converted optical signal (converted signal light) having a wavelength $\lambda$s' is output in synchronism with the time during which the waveform-shaped light and the clock pulses coexist.

The wavelength $\lambda$s' of the converted signal light output from the optical AND gate 4 is converted into a wavelength $\lambda$c (preferably, $\lambda$c=$\lambda$s) in the wavelength converter 6 to obtain regenerated light.

The optical clock regenerator 28 serves to regenerate clock pulses having reference time intervals from signal light disordered in time intervals.

For example, in the case of signal light having a speed of 160 Gb/s, a train of pulses having a frequency of 160 GHz arranged at 6.25 ps intervals is regenerated. The generation of clock pulses may be effected by first converting an optical signal into an electrical signal, next retiming the electrical signal, and next oscillating a mode-locked laser (MLL) by using the electrical RF signal. Alternatively, the MLL may be directly oscillated without opto-electric conversion.

However, in the case of a high-speed signal as of 160 Gb/s, the signal speed exceeds the limit of the operating speed in electronics, and the realization of the MLL operating at such a high speed is also difficult. Accordingly, it is preferable to regenerate a pulse train of lower speed such as 10 GHz and next generate clock pulses of 160 GHz by using OTDM (optical time division multiplexing).

Figure 5:
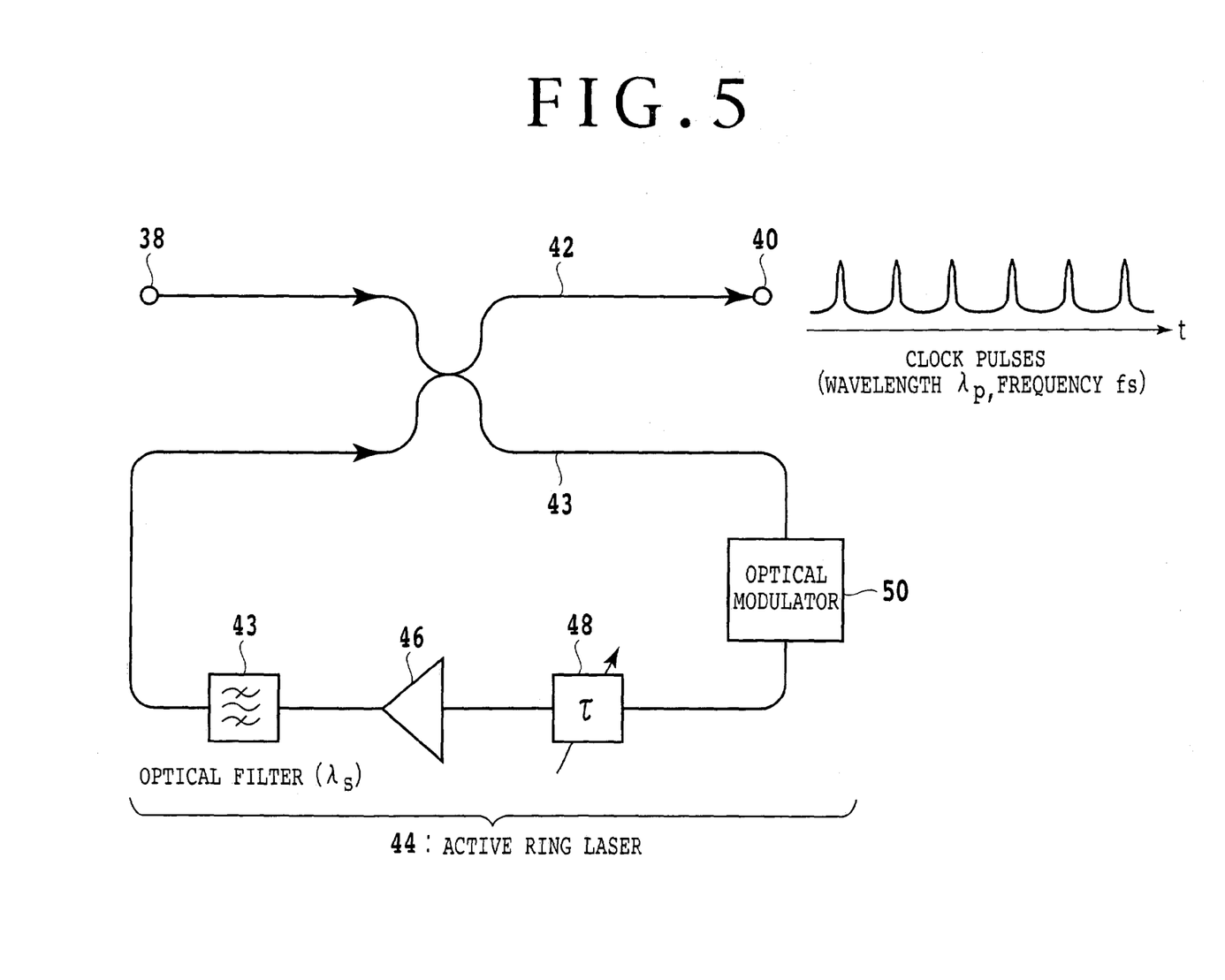
FIG. 5 is a block diagram showing a preferred embodiment of a clock regenerator applicable to the present invention.

FIG. 5 is a block diagram showing a preferred embodiment of the optical clock regenerator 28 shown in FIG. 4. This clock regenerator includes an optical path 42 provided between an input port 38 and an output port 40, and an active ring laser 44 including an optical loop 43 optically coupled (e.g., directionally coupled) to the optical path 42.

Signal light (second optical signal) having a wavelength $\lambda$s and a speed fs is supplied to the input port 38. The active ring laser 44 includes an optical amplifier 46 for compensating loss in the optical loop 43 so that laser oscillation occurs in the optical loop 43, an adjuster 48 for adjusting the optical path length of the optical loop 43 so that the speed (or frequency) fs becomes equal to an integral multiple of the reciprocal of a recirculation period of the optical loop 43, and an optical modulator (or nonlinear optical medium) 50 for mode-locking the laser oscillation according to the signal light. The active ring laser 44 may further include an optical bandpass filter 45 having a pass band including the wavelength $\lambda$p of the laser oscillation.

With this configuration, the laser oscillation of the active ring laser 44 is mode-locked, so that clock pulses having the wavelength $\lambda$p and the frequency fs are generated and output from the output port 40. Accordingly, clock pulses can be obtained without the need for opto/electric conversion, and it is possible to provide an all-optical clock regenerator insensitive to the speed and pulse shape of signal light.

The optical modulator 50 may be provided by an electro/optic modulator such as a $LiNbO_3$ intensity modulator and an EA (electro absorption) modulator. Alternatively, a modulation method using second-order or third-order nonlinear optical effects or cross gain modulation may be adopted. For example, in the case of using four-wave mixing in an optical fiber, the wavelength λs of signal light is set to a wavelength near the zero-dispersion wavelength of the fiber to effectively amplitude-modulate continuously oscillated light, thereby generating clock pulses. In the case of using a semiconductor optical amplifier (SOA), signal light can be used as pump light. In the case of using four-wave mixing in a DFB-LD in its oscillating state, the wavelength of signal light is set to a wavelength different from the wavelength of oscillated light in the DFB-LD, and this signal light is input with a relatively high power to induce gain saturation, thereby modulating the efficiency of four-wave mixing. Further, the continuously oscillated light can be effectively amplitude-modulated by a cross gain modulation (XGM) effect. This effect of XGM is exhibited also in the case of using four-wave mixing in an SOA, so that XGM may be positively used.

Also in the case of using second-order nonlinear optical effects, substantially the same effect can be obtained by using signal light as pump light. On the other hand, in the case of using cross phase modulation (XPM), amplitude modulation can be generated by using polarization fluctuations due to phase modulation, for example.

The waveform shaper 26 is provided to suppress the jitter of optical pulses. For understanding of its operating principle, there will now be examined a case where such waveform shaping is not performed. Since the signal light is temporally disordered, it includes a portion synchronized with the clock pulses and a portion slightly shifted from the clock pulses in the optical AND gate 4. For example, in the case of using a high-speed optical switch such as a NOLM (nonlinear optical loop mirror) as the optical AND gate 4, the amplitude of the resultant converted light is not constant because of the above temporal shift. Accordingly, if the cause of the temporal shift is a noisy one such as jitter, amplitude noise is added to the converted light.

To avoid the addition of such noise, the pulse shapes of the signal light to be input into the optical AND gate 4 are made rectangular in this preferred embodiment. Accordingly, the optical AND operation between the signal light and the clock pulses can be always effected within the width of each rectangular pulse, so that the addition of amplitude noise as mentioned above can be suppressed to thereby reduce the noise such as jitter.

Figure 6:
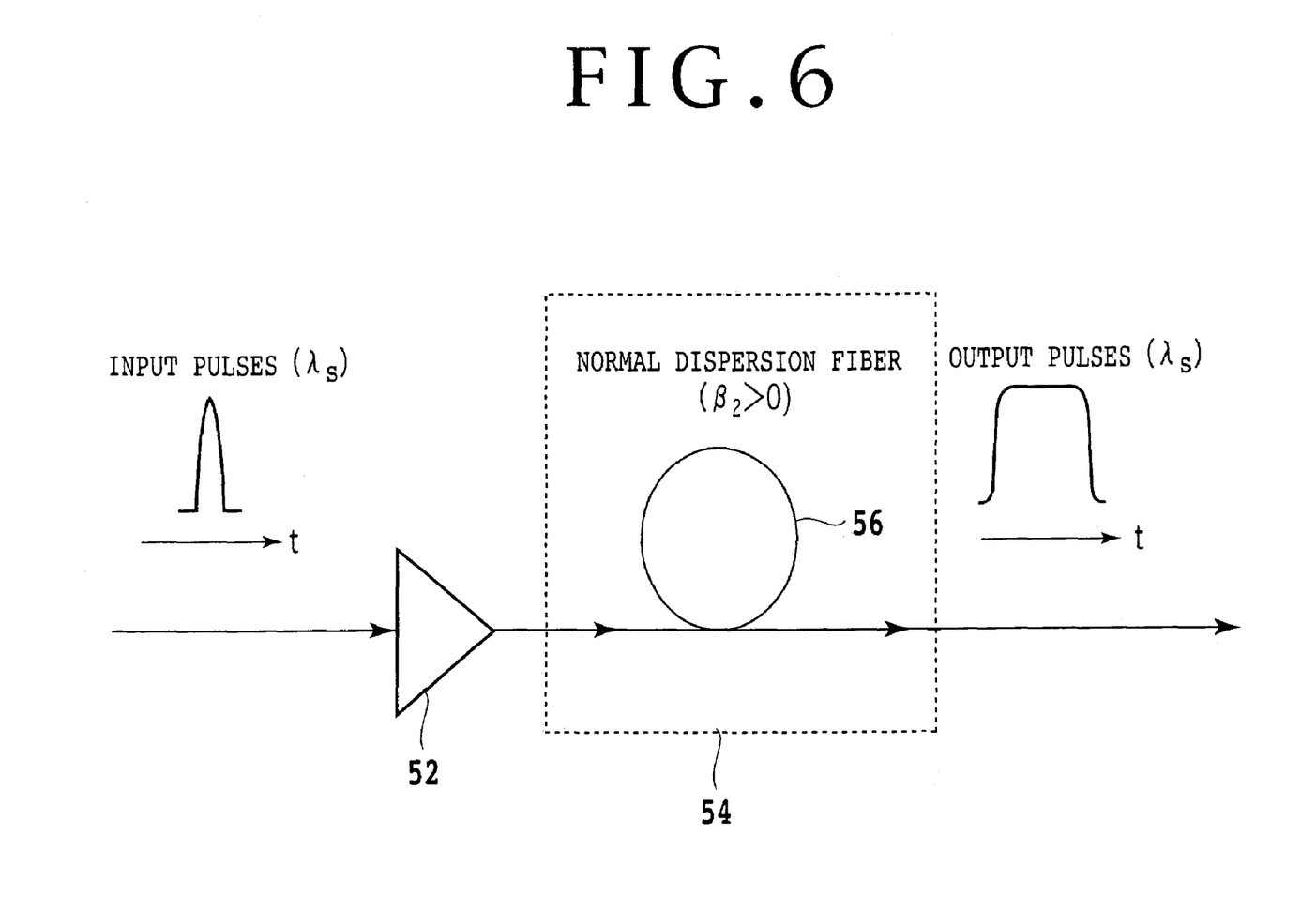
FIG. 6 is a block diagram showing a preferred embodiment of a waveform shaper applicable to the present invention.

FIG. 6 is a block diagram showing a preferred embodiment of the waveform shaper 26 shown in FIG. 4. An optical fiber 56 is used as an optical waveguide structure 54 for providing nonlinear optical effects. The GVD (group velocity dispersion) of the optical fiber 56 is $\beta_2$, and the optical fiber 56 gives normal dispersion and third-order nonlinear optical effects to signal light supplied.

An input pulse (first optical signal) having a center wavelength λs is amplified by an optical amplifier 52 to obtain a power enough to generate required chirping, and next input into the optical fiber 56. In the optical fiber 56, chirping is induced by SPM (self phase modulation) to thereby broaden (diffuse) the spectrum.

In the optical fiber 56, the chirp is induced by SPM, so that the leading edge of the optical pulse shifts toward the longer wavelengths, and the trailing edge of the optical pulse shifts toward the shorter wavelengths. For example, in the case that the optical fiber 56 is a normal-dispersion fiber, the GVD increases with an increase in wavelength. Accordingly, the width of the optical pulse is increased by the above chirp. The optical pulse can be broadened rectangularly by suitably increasing the dispersion of the optical fiber so as to rapidly change the waveform in a short time and by inputting to the optical fiber a high-power optical pulse whose leading and trailing edges are as steep as possible.

In actual, the third-order nonlinear optical effects are finite and some degree of fiber length is therefore necessary. Pulse broadening due to only chromatic dispersion rather than pulse broadening due to the chirp mentioned above occurs especially at the tail of an optical pulse where the nonlinear effects are relatively small. In such a case, a dispersion compensator is preferably located at the output end of the optical fiber, so as to compensate for the broadening due to the chromatic dispersion and thereby obtain an optical pulse having a nearly desired shape. For example, by using an optical fiber having a dispersion opposite in sign to the dispersion of the normal-dispersion fiber as the dispersion compensator, the dispersion of the normal-dispersion fiber can be effectively compensated. The value of dispersion of the optical fiber and the amount of compensation by the optical fiber as the dispersion compensator may be suitably adjusted according to the conditions of the input optical pulse and the optical fiber to be used.

Additional information on the rectangular pulse generating method using a normal-dispersion fiber is described in detail in Japanese Patent Application No. 2000-34454, for example. Other methods for obtaining rectangular pulses than by using an optical fiber in a normal dispersion region as mentioned with reference to FIG. 6 may include a method of using a fiber grating and a method of separating optical pulses into two orthogonal polarized waves, applying temporal delay to these polarized waves, and then combining these polarized waves.

Figure 7:
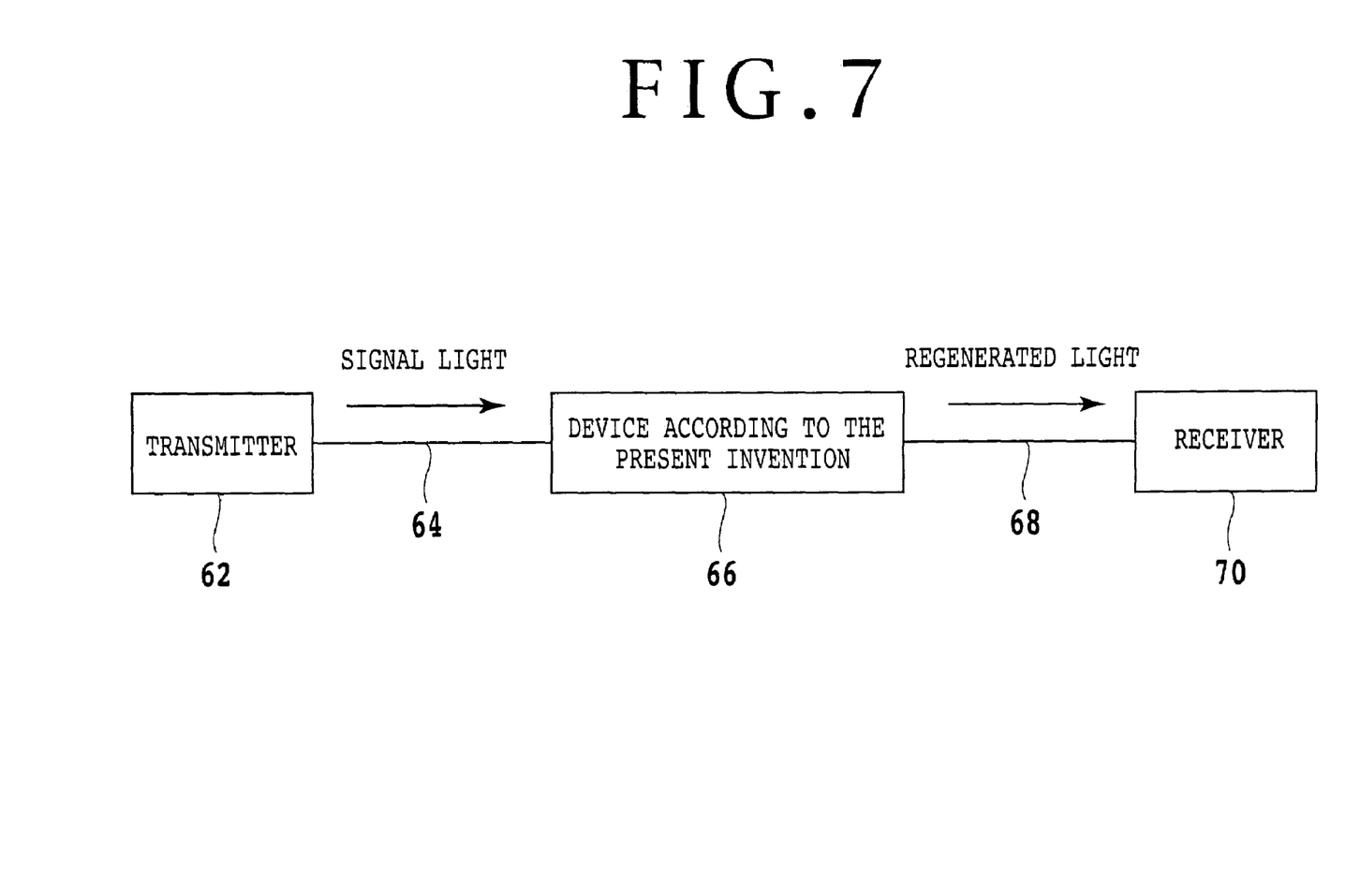
FIG. 7 is a block diagram showing a preferred embodiment of an optical fiber transmission system to which the present invention is applied.

Referring to FIG. 7, there is shown an optical fiber transmission system to which the present invention is applied. Signal light from a transmitter 62 is transmitted by a first optical fiber transmission line 64. The signal light transmitted is processed by a device 66 according to the present invention. Thereafter, resultant regenerated light is transmitted by a second optical fiber transmission line 68 and received by a receiver 70.

As the result of processing in the device 66 according to the present invention, waveform shaping or the like on the signal light can be effected. That is, the signal light degraded in quality by the transmission through the first optical fiber transmission line 64 undergoes optical 3R regeneration in the device 66 according to the present invention, thereby improving the quality and allowing the expansion of transmission length.

Although not shown, one or more optical amplifiers may be arranged along the optical fiber transmission lines 64 and/or 68 to configure a system capable of compensating for losses.

According to the present invention as described above, it is possible to remove amplitude noise and convert the wavelength of signal light into an arbitrary wavelength by performing spectral broadening and filtering.

Accordingly, it is possible to provide a method and device for waveform-shaping which can obtain sufficient 2R and/or 3R functions and a function of ultrafast optical switching.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical AND gate comprising:
   a nonlinear optical medium inputting signal light having a first wavelength and probe light having a second wavelength different from the first wavelength and producing cross phase modulation of the probe light with the signal light to thereby output spectrally broadened light; and an optical filter extracting light including a modulated component of the signal light and having a band narrower than the band of the spectrally broadened light, from the spectrally broadened light, wherein a band of said first wavelength and said second wavelength are not included in the band of said optical filter.

2. The optical AND gate-according to claim 1, wherein the signal light and the probe light to be input into the optical AND gate are light obtained by broadening the pulse width of signal light from a transmission line and an optical clock extracted from the signal light from the transmission line, respectively.

3. The optical AND gate-according to claim 1, wherein the nonlinear optical medium is a single-mode optical fiber.

4. The optical AND gate according to claim 1, both edge components of said spectrally broadened light corresponding to the shortest wavelength and the longest wavelength are not included in the band of said optical filter.

5. A waveform shaping device comprising:
an optical AND gate comprising:
a nonlinear optical medium inputting signal light having a first wavelength and probe light having a second wavelength different from the first wavelength and producing cross phase modulation of the probe light with the signal light to thereby output spectrally broadened light; and
an optical filter extracting light including a modulated component of the signal light and having a band narrower than the band of the spectrally broadened light, from the spectrally broadened light;
a second nonlinear optical medium inputting output light from an optical AND gate and producing self phase modulation of the output light from the optical AND gate to thereby output second spectrally broadened light; and
a second optical filter extracting light including a signal component of the output light from the optical AND gate and having a band narrower than the band of the second spectrally broadened light, from the second spectrally broadened light.

6. A waveform shaping device comprising:
an optical AND gate comprising:
a nonlinear optical medium inputting signal light having a first wavelength and probe light having a second wavelength different from the first wavelength and producing cross phase modulation of the probe light with the signal light to thereby output spectrally broadened light; and
an optical filter extracting light including a modulated component of the signal light and having a band narrower than the band of the spectrally broadened light, from the spectrally broadened light;
a second nonlinear optical medium inputting output light from an optical AND gate and second probe light having a wavelength different from the wavelength of the output light from the optical AND gate and producing cross phase modulation of the second probe light with the output light from the optical AND gate to thereby output second spectrally broadened light; and
a second optical filter extracting light including a signal component of the output light from the optical AND gate and having a band narrower than the band of the second spectrally broadened light.

7. The waveform shaping device according to claim 5 or 6, wherein the signal light and the probe light to be input into the optical AND gate are light obtained by broadening the pulse width of signal light from a transmission line and an optical clock extracted from the signal light from the transmission line, respectively.

8. The waveform shaping device according to claim 5 or 6, wherein the nonlinear optical medium is a single-mode optical fiber.

9. A waveform shaping device comprising
an optical AND gate;
a nonlinear optical medium inputting output light from the optical AND gate and probe light having a wavelength different from the wavelength of the output light from the optical AND gate and producing cross phase modulation of the probe light with the output light from the optical AND gate to thereby output spectrally broadened light; and
an optical filter extracting light including a signal component of the output light from the optical AND gate and having a band narrower than the band of the spectrally broadened light, from the spectrally broadened light,
wherein a band of said first wavelength and said second wavelength are not included in the band of said optical filter.

10. The waveform shaping device according to claim 9, wherein signal light and probe light to be input into the optical AND gate are light obtained by broadening the pulse width of signal light from a transmission line and an optical clock extracted from the signal light from the transmission line, respectively.

11. The waveform shaping device according to claim 9, wherein the nonlinear optical medium is a single-mode optical fiber.

12. The waveform shaping device according to claim 9, both edge components of said spectrally broadened light corresponding to the shortest wavelength and the longest wavelength are not included in the band of said optical filter.

13. A waveform shaping method comprising:
inputting signal light having a first wavelength and probe light having a second wavelength different from the first wavelength into a nonlinear optical medium and producing cross phase modulation of the probe light with the signal light in the nonlinear optical medium to thereby output spectrally broadened light; and
extracting light including a modulated component of the signal light and having a band narrower than the band of the spectrally broadened light, from the spectrally broadened light,
wherein a band of said first wavelength and said second wavelength are not included in the band of the extracted light.

14. The waveform shaping method according to claim 13, both edge components of said spectrally broadened light corresponding to the shortest wavelength and the longest wavelength are not included in the band of the extracted light.

15. A waveform shaping method comprising:
inputting output light obtained by inputting signal light having a first wavelength and probe light having a second wavelength different from the first wavelength into a nonlinear optical medium and producing cross phase modulation of the probe light with the signal light in the nonlinear optical medium to thereby output spectrally broadened light; and extracting light including a modulated component of the signal light and having a band narrower than the band of the spectrally broadened light, from the spectrally broadened light into a second nonlinear optical medium and producing self phase modulation of the output light to thereby output second spectrally broadened light; and extracting light including a signal component of the output light and having a band narrower than the band of the second spectrally broadened light, from the second spectrally broadened light.

16. A waveform shaping method comprising:

inputting output light obtained by inputting signal light having a first wavelength and probe light having a second wavelength different from the first wavelength into a nonlinear optical medium and producing cross chase modulation of the probe light with the signal light in the nonlinear optical medium to thereby output spectrally broadened light; and extracting light including a modulated component of the signal light and having a band narrower than the band of the spectrally broadened light, from the spectrally broadened light and second probe light having a wavelength different from the wavelength of the output light into a second nonlinear optical medium and producing cross phase modulation of the second probe light with the output light to thereby output second spectrally broadened light; and extracting light including a signal component of the output light and having a band narrower than the band of the second spectrally broadened light, from the second spectrally broadened light.

17. A waveform shaping device comprising:

first means for splitting input signal light into first signal light and second signal light;

second means for waveform-shaping the first signal light to output waveform-shaped light;

third means for extracting an optical clock from the second signal light;

fourth means for inputting the waveform-shaped light and the optical clock, broadening the spectrum of the optical clock under AND conditions to obtain first spectrally broadened light, and extracting a predetermined band from the first spectrally broadened light; and fifth means for inputting output light from the fourth means, broadening the spectrum of the output light to obtain second spectrally broadened light, and extracting a predetermined band from the second spectrally broadened light.

18. An optical communication system including a transmitter, a receiver, an optical transmission line for connecting the transmitter and the receiver, and a device according to claim 17 inserted in the optical transmission line.

* * * * *

UNITED STATES PATENT AND TRADEMARK OFFICE
CERTIFICATE OF CORRECTION

PATENT NO. : 6,987,607 B2
APPLICATION NO. : 10/602629
DATED : January 17, 2006
INVENTOR(S) : Shigeki Watanabe It is certified that error appears in the above-identified patent and that said Letters Patent is hereby corrected as shown below:

On the Front Page: Column 2, line 1, Foreign Patent Documents, After "4/2001" insert --G02F/1/35--;

Column 13, line 12, claim 2, replace "gate-according" with --gate according--, therefor;

Column 13, line 18, claim 3, replace "gate-according" with --gate according--, therefor;

Column 14, line 12, claim 9, after "comprising" insert --:-- (colon);

Column 15, line 17, claim 16, replace "chase" with --phase--, therefor.

Signed and Sealed this

Eleventh Day of July, 2006

JON W. DUDAS
*Director of the United States Patent and Trademark Office*